3,342,583
METHOD OF CONTROLLING THE GROWTH OF UNDESIRABLE PLANTS

Erik A. Regel, Mission, Kans., assignor to Chemagro Corporation, New York, N.Y., a corporation of New York
No Drawing. Original application Jan. 23, 1964, Ser. No. 339,610. Divided and this application May 3, 1966, Ser. No. 560,343
18 Claims. (Cl. 71—87)

---

ABSTRACT OF THE DISCLOSURE

Compounds having the formula

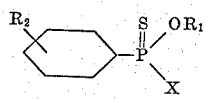

where $R_1$ is selected from the group consisting of alkyl, haloalkyl, alkoxyaryl, nitrohaloaryl, aryl, benzyl, haloaryl, where the halogen has an atomic weight between 35 and 80, and acyloxyethyl; $R_2$ is selected from the group consisting of hydrogen, alkyl and halogen and X is selected from the group consisting of halogen of atomic weight between 35 and 80 and —NCS are effective pre- and post-emergent herbicides and are particularly valuable in controlling broad leaf plants in the crop of narrow leaf plants.

---

This invention relates to novel herbicides.

This application is a division of my copending application, Ser. No. 339,610, filed Jan. 23, 1964, now abandoned.

It is an object of the present invention to develop novel herbicidal compositions.

A further object is to prepare pre-emergent and post-emergent herbicides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that herbicidal activity has been noted when compounds having the formula

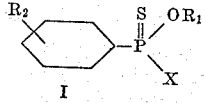

are applied to the soil prior to the emergence of noxious plants or when compounds of Formula I are applied to the soil and/or the plant itself after the emergence of the noxious plants.

In Formula I, $R_1$ is alkyl, haloalkyl, e.g., chloroalkyl or bromoalkyl, benzyl, aryl, haloaryl, e.g., chloroaryl or bromoaryl, nitrochloroaryl, nitrobromoaryl, alkoxyaryl or aryloxyethyl, $R_2$ is hydrogen, alkyl, halogen, e.g., chlorine or bromine, and X is chlorine, bromine or NCS (isothiocyanate). The NCS group has been found to act as a pseudohalogen. Chlorine and bromine generically may be defined as halogens containing an atomic weight between 35 and 80.

In the above formula most preferably $R_1$ is alkyl, chloroalkyl or chloroaryl, $R_2$ is most preferably hydrogen and X is most preferably chlorine.

The compounds of the present invention are particularly valuable for their remarkable post-emergence herbicidal activity.

The most effective post-herbicide on a variety of broadleaf weeds was phenylphosphonochloridothioic acid-O-butyl ester. In general, the O-lower alkyl and O-halo lower alkyl esters of phenylphosphonochloridothioic acid were the most active herbicides found except for the ethyl ester which was relatively low in activity. Compounds of the formula

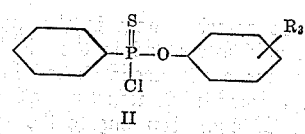

showed good herbicide activity when $R_3$ was hydrogen, lower alkyl or halogen but did not have good herbicidal activity when $R_3$ was nitro, hydroxy or alkoxy unless a halogen atom was also present on the ring. It is essential to have both sulfur and either chlorine, bromine or NCS attached to the phosphorus atom. Thus, the P=O analogs did not have herbicidal activity, nor did compounds of the formula

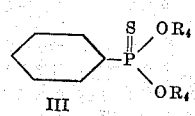

where $R_4$ is alkyl. There is a slight decrease in herbicidal activity when X is —NCS rather than chlorine. However, there is sometimes a more selective herbicide activity when the —NCS group is present. This can be taken advantage of when it is desired to grow a specific plant and to kill related species.

The starting materials such as

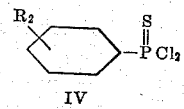

where $R_2$ is as previously defined are usually less herbicidally active than the monoesters of the present invention.

The arylphosphonochloridothioic acid esters are, in general, easily made by a simple esterification process

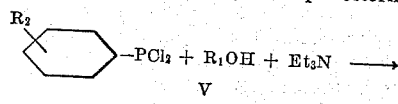

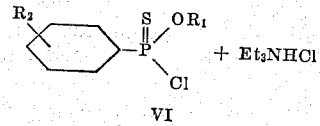

where $R_1$ and $R_2$ are as previously defined. Yields of up to 90% are obtained by this reaction of a dichloroarylphosphine sulfide and a hydroxy compound (alcohol or phenol) in the presence of a tertiary base such as triethyl amine, tributyl amine, pyridine, etc. By replacing the two chlorines in Formula V by bromine atoms, the corresponding products are obtained where X is bromine.

Dichlorophenylphosphine sulfide which is used as the starting material for many of the compounds is readily available commercially.

The dichloro-(chloro and alkyl) phenyl phosphines of the formula

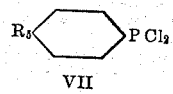

where $R_5$ is chlorine or alkyl, e.g., methy or ethyl, used as starting materials are made as described in Organic Syntheses vol. 31, page 88. Thus, chlorobenzene (or toluene or ethylbenene) is treated with phosphorus trichloride and aluminum chloride at reflux temperature. A complex is formed with liberation of hydrogen chloride. The complex is decomposed by addition of phosphorus oxychloride to give the dichloro (chloro) phenyl phosphine or the line as a mixture of ortho and para isomers in 50 to 80% yields. The dichloro chloroaryl (or aryl) phosphines are then oxidized by the addition of sulfur and heating the mixture for several hours at 130° C. to give the dichloro choloraryl (or aryl) phosphine sulfides in 90% yield. There is no need to separate the ortho and para isomers prepared since both are effective as herbicides.

Replacing the chlorine atom in the aryl phosphonochloridothioic acid esters and in the dichloro arylphosphine sulfides was easily accomplished in yields up to 80% by an interchange reaction by heating with ammonium thiocyanate, e.g., according to the equation

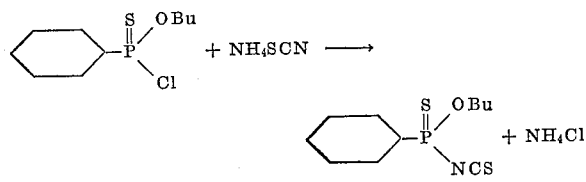

As previously stated, many of the compounds employed as herbicides in the present invention are old per se, e.g., in Newallis Patent 3,082,147, column 1, lines 65–72, and column 2, lines 16–17, Newallis Patent 3,065,125, column 4, lines 22–32, and Dawson Patent 2,913,367, column 1, line 66–71. However, the isothiocyanate compounds employed as herbicides are novel per se.

Examples of compounds having herbicidal activity according to the invention are

O-methyl phenylphosphonochloridothionate,
O-ethyl phenylphosphonochloridothionate,
O-propyl phenylphosphonochloridothionate,
O-butyl phenylphosphonochloridothionate,
O-secondary butyl phenylphosphonochloridothionate,
O-tertiary butyl phenylphosphonochloridothionate,
O-isobutyl phenylphosphonochloridothionate,
O-octyl phenylphosphonochloridothionate,
O-amyl phenylphosphonochloridothionate,
O-cyclohexyl phenylphosphonochloridothionate,
O-decyl phenylphosphonochloridothionate,
O-dodecyl phenylphosphonochloridothionate,
O-butyl phenylphosphonobromidothionate,
O-octyl phenylphosphonobromidothionate,
O-methyl phenylphosphonoisothiocyanatothionate,
O-octyl phenylphosphonoisothiocyanatothionate,
O-benzyl phenylphosphonoisothiocyanatothionate,
O-(2-chloroethyl) phenylphosphonoisothiocyanatothionate,
O-(2,3-dichloropropyl) phenylphosphonoisothiocyanatothionate,
O-(acetoxyethyl) phenylphosphonoisothiocyanatothionate,
O-(2-methylphenyl) phenylphosphonoisothiocyanatothionate,
O-butyl phenylphosphonoisothiocyanatothionate,
O-hexyl phenylphosphonoisothiocyanatothionate,
O-benzyl phenylphosphonochloridothionate,
O-(2-chloroethyl) phenylphosphonochloridothionate,
O-(2,3-dichloropropyl) phenylphosphonochloridothionate,
O-(2,3-dichloroisopropyl) phenylphosphonochloridothionate,
O-(2,4-dichloronaphthyl-1) phenylphosphonochloridothionate,
O-(2-bromoethyl) phenylphosphonochloridothionate,
O-(2,3-dibromopropyl) phenylphosphonobromidothionate,
O-(acetoxyethyl) phenylphosphonochloridothionate,
O-(propionoxyethyl) phenylphosphonochloridothionate,
O-(butyroxypropyl) phenylphosphonochloridothionate,
O-phenyl phenylphosphonochloridothionate,
O-(2-methylphenyl) phenylphosphonochloridothionate,
O-(3-methylphenyl) phenylphosphonochloridothionate,
O-(4-methylphenyl) phenylphosphonochloridothionate,
O-(4-butylphenyl) phenylphosphonochloridothionate,
O-(2-methylphenyl) phenylphosphonobromidothionate,
O-phenyl phenylphosphonoisothiocyanatothionate,
O-(2,4-dimethylphenyl) phenylphosphonochloridothionate,
O-(3,4-dimethylphenyl) phenylphosphonochloridothionate,
O-(2-chlorophenyl) phenylphosphonochloridothionate,
O-(4-chlorophenyl) phenylphosphonochloridothionate,
O-(3-bromophenyl) phenylphosphonochloridothionate,
O-(2,4-dichlorophenyl) phenylphosphonoisothiocyanatothionate,
O-(3-nitrophenyl) phenylphosphonochloridothionate,
O-(4-chlorophenyl) phenylphosphonoisothiocyanatothionate,
O-(3-chloro-4-nitrophenyl) phenylphosphonochloridothionate,
O-(4-bromo-3-nitrophenyl) phenylphospnonochloridothionate,
O-(2,6-dichloro-4-nitrophenyl) phenylphosphonochloridothionate,
O-(2-methoxy-4-propene-1'-phenyl) phenylphosphonochloridothionate,
O-(2,6-dimethoxyphenyl) phenylphosphonochloridothionate,
O-(2-ethoxyphenyl) phenylphosphonochloridothionate,
O-butyl-4-chlorophenylphosphonochloridothionate,
O-octyl 2-chlorophenylphosphonochloridothionate,
O-propyl 3-chlorophenylphosphonochloridothionate,
O-butyl 4-bromophenylphosphonochloridothionate,
O-octyl 2-bromophenylphosphonobromidothionate,
O-amyl 4-chlorophenylphosphonoisothiocyanatothionate,
O-(2-chloroethyl) 4-chlorophenylphosphonochloridothionate,
O-butyl 4-methylphenylphosphonochloridothionate,
O-octyl 2-methylphenylphosphonochloridothionate,
O-butyl 4-ethylphenylphosphonochloridothionate,
O-butyl 4-tertiary butylphenylphosphonochloridothionate,
O-butyl 4-chlorophenylphosphonoisothiocyanatothionate,
O-heptyl-4-bromophenylphosphonochloridothionate,
O-hexyl-4-butylphenylphosphonoisothiocyanatothionate.

The isothiocyanatothionates have proven to be extremely effective as herbicides.

The chloridothionates in the examples were made by employing equimolar amounts of the appropriate dichloroarylphosphine sulfide, hydroxy compound and triethylamine. The mixture of hydroxy compound and triethylamine was added with stirring within one-half hour to a solution of the dichloroarylphosphine oxide in benzene or carbon tetrachloride at room temperature and the temperature was maintained at 35° C. Within one hour the reaction was completed. The white precipitate of triethylamine hydrochloride and the filter cake were washed with the solvent employed in the reaction (i.e., benzene or carbon tetrachloride). The combined filtrate and washing solutions were washed with 5% aqueous hydrogen chloride, water and finally with 5% aqueous sodium bicarbonate, dried over anhydrous sodium sulfate and the solvent removed in vacuum and the crude product purified by distillation under reduced pressure.

EXAMPLE 1: COMPOUND NO. 7

*O-butyl phenylphosphonochloridothionate*

To 211 g. (1 mole) dichlorophenylphosphine sulfide and 130 ml. benzene was added at room temperature a mixture of 74 g. (1 mole) normal butyl alcohol and 104 g. (1.02 moles) triethylamine under vigorous stirring for several hours. The formed triethylamine hydrochloride was filtered and the filtrate was washed with water, dried over anhydrous sodium sulfate and the solvent was distilled off. The crude product was distilled under vacuum. (See Table I for properties.)

EXAMPLE 2: COMPOUND NO. 12

*(O-cresyl) phenylphosphonochloridothionate*

To 211.2 g. (1 mole) dichlorophenyl phosphine sulfide and 1000 ml. benzene was added at room temperature a mixture of 108 g. (1 mole) o-cresol and 101 g. (1 mole) triethylamine. The reaction mixture was stirred for 1.5 hours and worked up by the procedure given in Example 1. The crude product was distilled under vacuum. (See Table II for properties.)

EXAMPLE 3: COMPOUND NO. 1

*O-methyl phenylphosphonochloridothionate*

To 211.2 g. (1 mole) dichlorophenylphosphine sulfide and 200 ml. carbon tetrachloride was added at room temperature a mixture of 32 g. (1 mole) methyl alcohol and 104 g. (1.03 moles) triethylamine. The reaction mixture was stirred for 1.5 hours and worked up by the procedure given in Example 1. The crude product was distilled under vacuum. (See Table 1 for properties.)

EXAMPLE 5: COMPOUND NO. 24

*O-butyl phenylphosphonoisothiocyanatothionate*

The isothiocyanatothionate was prepared by adding 0.1 mole of O-butyl phenylphosphonochloridothionate to 0.13 mole of ammonium thiocyanate dissolved in acetonitrile at 40° C. Ammonium chloride precipitated immediately. The mixture was stirred for 2 hours at 60° C., filtered, washed, dried and the filtrate stripped.

The compounds in Table I had the formula

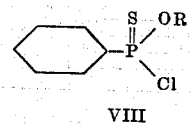

VIII where R is as shown in the table. There were employed as the starting materials dichlorophenylphosphine sulfide

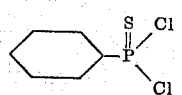

and the indicated alcohol or phenol.

TABLE I

| Compound | R in Formula VIII | Starting Alcohol or Phenol | Yield | B.P. ° C. (mm. Hg.) | $n_D^{20}$ |
|---|---|---|---|---|---|
| 1 | Methyl | Methanol | 63 | 90 (0.005) | 1.6173 |
| 2 | Ethyl | Ethanol | 90 | 90 (0.001) | 1.5741 |
| 3 | 2-chloroethyl | Ethylene chlorhydrin | 90 | 120 (0.05) | 1.5888 |
| 4 | —CH₂CH(Cl)CH₂Cl | 2,3-dichloropropanol-1 | 50 | 160 (0.05) | 1.5832 |
| 5 | —CH(CH₂Cl)₂ | 1,3-dichloropropanol-2 | 20 | 160 (0.05) | 1.5885 |
| 6 | CH₂CH₂OCOCH₃ | Ethylene glycol monoacetate | 10 | | 1.5987 |
| 7 | Butyl | n-Butanol | 80 | 95 (0.002) | 1.5538 |
| 8 | Octyl | n-Octanol | 62 | 134-5 (0.001) | 1.5339 |
| 9 | Benzyl | Benzyl alcohol | 80 | | |
| 10 | 2,4-dichloronaphthyl-(1) | 2,4-dichloronaphthol-1 | 66 | | |

EXAMPLE 4: COMPOUND NO. 14

*O-(p-cresyl) phenylphosphonochloridothionate*

To 211.2 g. (1 mole) dichlorophenylphosphine sulfide and 670 ml. carbon tetrachloride was added at room temperature a mixture of 108 g. (1 mole) p-cresol and 101 g. (1 mole) triethylamine. The reaction mixture was stirred for three hours and worked up by the procedure given in Example 1. The crude product was distilled under vacuum. (See Table II for properties.)

The compounds in Table II has the formula

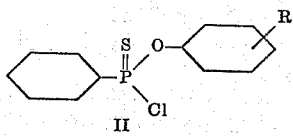

II where R is as shown in the table. There were employed as the starting materials dichlorophenylphosphine sulfide and the indicated phenol.

TABLE II

| Compound | R in Formula II | Starting Phenol | Yield | B.P.° C. (mm. Hg.) | $n_D^{20}$ |
|---|---|---|---|---|---|
| 11 | H | Phenol | 73 | 144 (0.001) | 1.6206 |
| 12 | 2-methyl | o-Cresol | 97 | | 1.6090 |
| 13 | 3-methyl | m-Cresol | 60 | 145 (0.01) | 1.6122 |
| 14 | 4-methyl | p-Cresol | 65 | 160 (0.05) | 1.6117 |
| 15 | 2,4-dimethyl | 2,4-xylenol | 73 | 160 (0.01) | 1.6065 |
| 16 | 3,4-dimethyl | 3,4-xylenol | 60 | 180 (0.025) | 1.6095 |
| 17 | 4-chloro | 4-chlorophenol | 92 | 140 (0.008) | 1.6249 |
| 18 | 2,4-dichloro | 2,4-dichlorophenol | 52 | 190 (0.001) | 1.6311 |
| 19 | 3-chloro-4-nitro | 3-chloro-4-nitro-phenol | 80 | Oil | |
| 20 | 2,6-dichloro-4-nitro | 2,6-dichloro-4-nitrophenol | 91 | | |
| 21 | 2-CH₃O-4-CH=CHCH₃ | 2-methoxy-4-(1)-propenyl phenol | 97 | | 1.6238 |
| 22 | 2,6-dimethoxy | 2,6-dimethoxyphenol | 33 | 180 (0.025) | 1.6080 |
| 23 | 2-ethoxy | 2-ethoxyphenol | 53 | 174 (0.004) | 1.6022 |

The compounds in Table III had the formula

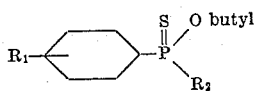

where $R_1$ and $R_2$ are as shown in the table.

TABLE III

| Compound | $R_1$ | $R_2$ | Yield | B.P. ° C. (mm. Hg.) | $n_D^{20}$ |
|---|---|---|---|---|---|
| 24 | H | —NCS | 66 | 135 (0.001) | 1.5885 |
| 25 | 4-chloro | Cl | 50 | 140 (0.005) | 1.5677 |
| 26 | 4-methyl | Cl | 50 | 150 (0.02) | 1.5541 |
| 27 | 4-ethyl | Cl | 50 | 150 (0.03) | 1.5540 |

The compounds in Table IIIa had the formula

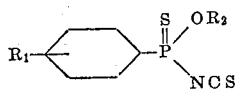

TABLE IIIa

| Compound | $R_1$ | $R_2$ | Yield | B.P. ° C. (mm. Hg.) | $n_D^{20}$ |
|---|---|---|---|---|---|
| 28 | H | Me | 80 | 105 (0.03) | 1.6225 |
| 29 | H | Et | 80 | 108 (0.03) | 1.6097 |
| 30 | H | CH$_2$CH$_2$Cl | 70 | 137 (0.03) | 1.6183 |
| 31 | H | Pr | 90 | 125 (0.02) | 1.6000 |
| 32 | H | Iso-Pr | 74 | 110 (0.02) | 1.6225 |
| 33 | H | Ph | 67 | 162 (0.02) | 1.6451 |
| 34 | H | 3-MePh | 95 | 164 (0.04) | 1.6375 |
| 35 | H | 4-MePh | 50 | 160 (0.02) | 1.6308 |
| 36 | H | 2,4-Me$_2$Ph | 65 | | 1.6169 |
| 37 | H | 3,4-Me$_2$Ph | 80 | 175 (0.03) | 1.6359 |

Compound 24 was prepared by reacting O-butyl phenylphosphonochloridothionate with ammonium thiocyanate. Compound 25 was prepared by reacting dichloro-4-chlorophenylphosphine sulfide with n-butanol. Compound 26 was prepared by reacting dichloro-4-methylphenylphosphine sulfide with n-butanol and Compound 27 was prepared by reacting dichloro-4-ethylphenylphosphine sulfide with n-butanol.

Compounds 28–37 were prepared in the same manner as Compound 24 by substituting the appropriate O-alkyl phenylphosphonochloridothionate or O-chloroethyl phenylphosphonochloridothionate for the same molar amount of O-butyl phenylphosphonochloridothionate.

The herbicides of the present invention can be applied in undiluted form to the plant to be killed, or to the soil in which the plant is growing or to the soil in which it is desired to prevent the plant from growing. It is frequently desirable to apply the herbicides in admixture with either solid or liquid pesticidal adjuvants. Thus the herbicides can be applied, for example, as aqueous or organic solvent dispersions. The choice of an appropriate solvent is determined largely by the concentration of active ingredient which it is desired to be employed, by the volatility of solvent desired, and the cost of solvent. Among the many suitable organic solvents which can be used as carriers for the present pesticides, there may be mentioned hydrocarbons such as benzene, toluene, xylene, kerosene, diesel oil, fuel oil, petroleum naphtha, α methyl naphthalene, mineral spirits, hexane, octane and petroleum ether, ketones such as methyl ethyl ketone, acetone, methyl isobutyl ketone and cyclohexanone, chlorinated hydrocarbons such as carbon tetrachloride, chloroform, trichloroethylene, ethylene dichloride and ethylene dibromide, esters such as methyl acetate, ethyl acetate, butyl acetate and amyl acetate, the monoalkyl ethers of ethylene glycol, e.g., ethylene glycol monomethyl ether and ethylene glycol monoethyl ether, the monoalkyl ethers of diethylene glycol, e.g., the monoethyl ether of diethylene glycol and the monomethyl ether of diethylene glycol, alcohols such as ethanol, isopropanol, amyl alcohol, butyl alcohol and isooctyl alcohol; butyl carbitol acetate (butyl ether of diethylene glycol monoacetate).

The herbicides can be applied to the plants or soil along with solid adjuvants or carriers such as talc, pyrophyllite, attapulgus clay, kieselguhr, chalk, diatomaceous earth, lime, calcium carbonate, bentonite, kaolin, montmorillonite, fuller's earth, cottonseed hulls, wheat flour, soybean flour, pumice, tripoli, wood flour, walnut shell flour, redwood flour and lignin.

It is frequently desirable to incorporate a surface active agent in the compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benezene sulfonates having 14 to 18 carbon atoms, alkylphenolethylene oxides, e.g., p-nonylphenol condensed with 10 ethylene oxide units, or p-isooctyl phenol condensed with 10 ethylene oxide units or with 2 ethylene oxide units or with 16 ethylene oxide units, and soaps, e.g., sodium stearate and sodium oleate. Typical surface active agents are: sodium salt of propylated naphthalene-sulfonic acid;

Aerosol OT (di-2-ethylhexyl) ester of sodium sulfosuccinic acid; sodium salt of modified alcohol sulfate from cocoanut fatty acids; sodium salt sulfonated monoglyceride of cocoanut fatty acids; sodium sulfonate of butylbisphenyl sorbitan sesquioleate; lauryl-trimethyl ammonium chloride; octadecyltrimethyl ammonium chloride; polyethylene glycol lauryl ether; Daxad No. 11 (sodium salt of polymerized alkylated arene sulfonic acid); sodium oleyl sulfate; sodium lauryl sulfate; Ethofats (polyethylene esters of fatty acids or rosin acids, e.g., Ethofat 3, 7, 11, 13, 15, 19); Ethomeens (polyethylene glycol derivatives of long chain alkylamines), e.g., Ethomeen 8, 10, 12, 14; Ethomids (polyethylene glycol derivatives of long chain alkylamides), e.g., Ethomid 8, 10, 12, 14; Igepal CA (alkyl-phenyl polyethylene glycol ether); sodium N-methyl-N-oleyltaurate; sodium oleyl isethionate; sodium dibutyl naphthalene sulfonate; sodium lignin sulfonate; polyethylene glycol stearate; sodium dodecyl benzene sulfonate; Ninol 1281 (fatty acid ethanolamide); tertiary dodecyl polyethylene glycol thioether; Pluronics (condensation product of ethylene oxide and polypropylene glycol); sodium dodecyl benzenesulfonate; sodium decyl benzenesulfonate; sorbitan monolaurate; sorbitan monopalmitate; sorbitan monostearate; sorbitan monooleate; polyethylene glycol ester of tall oil acids; Sulframin DR (sodium salt of sulfonated condensation product of ethanolamine with a fatty acid); Tergitol 08 [$C_4H_9CH(C_2H_5)CH_2OSO_3Na$]; Triton W-30 [$p$-$C_8H_{17}C_6H_4(OCH_2CH_2)_2OSO_3Na$ where $C_8H_{17}$ is diisobutyl]; Triton X-100 [$p$-$C_8H_{17}C_6H_4(OCH_2CH_2)_nOH$ where $C_8H_{17}$ is diisobutyl and $n$ is 10]; tris (polyoxyethylene) sorbitan monolaurate; tris (polyoxyethylene) sorbitan monopalmitate; tris (polyoxyethylene) sorbitan monostearate; tris (polyoxyethylene) sorbitan monooleate; sodium salt of sulfonated alkyl benzimidazole; sodium dihexyl sulfosuccinate; and Turkey Red oil.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

In the following tables formulation A is employed, unless otherwise indicated.

50 parts by weight of the herbicide (active ingredient to be tested)
45 parts by weight of a mixture of monodi and tri methyl-naphthalenes (Velsicol AR 50G)
5 parts by weight of Triton X161 (mixture of p-octyl-phenol-ethylene oxide adduct containing about 16 ethylene oxide units together with a sodium alkylphenyl sulfonate)

The pounds per acre value in the tables is the pounds of herbicide (active ingredient) applied per acre.

In Table IV the plants in the flats were 10 to 14 days old at the time of application. 50 ml. of a 4% active ingredient emulsion was made by emulsifying 4 grams of formulation A in 50 ml. of water. The flats were placed in an area of 5 sq. ft. and sprayed as indicated at a rate of 20 lbs./acre and 5 lbs./acre with the above water emulsion. Observations and records were made 5 days later.

Readings were based on a 0 to 10 scale, where 0 indicates no damage or effect and 10 indicates a complete kill of the plant.

TABLE IV

| Compound | Lbs./acre | Tomatoes | Sugar Beets | Radish | Wheat | Oats |
|---|---|---|---|---|---|---|
| 1 | 20 | 5 | 9 | 7 | 0 | 1 |
|   | 5  | 6 | 6 | 1 | 0 | 1 |
| 2 | 20 | 5 | 7 | 7 | 0 | 0 |
|   | 5  | 3 | 0 | 1 | 0 | 0 |
| 3 | 20 | 8 | 9.7 | 8 | 1 | 2 |
|   | 5  | 6 | 6 | 3 | 1 | 1 |
| 4 | 20 | 9 | 9 | 7 | 2 | 2 |
|   | 5  | 7 | 7 | 5 | 2 | 3 |
| 5 | 20 | 9 | 9 | 7 | 3 | 3 |
|   | 5  | 9 | 5 | 3 | 0 | 0 |
| 6 | 20 | 9 | 0 | 4 | 0 | 0 |
|   | 5  | 7 | 10 | 0 | 0 | 0 |
| 7 | 20 | 7 | 10 | 8 | 7 | 7 |
|   | 5  | 8 | 4 | 3 | 0 | 0 |
| 8 | 20 | 4 | 9.7 | 8 | 3 | 4 |
|   | 5  | 3 | 6 | 7 | 1 | 1 |
| 9 | 20 | 7 | 6 | 2 | 0 | 1 |
|   | 5  | 5 | 4 | 0 | 0 | 0 |
| 10 | 20 | 2 | 8 | 4 | 0 | 0 |
|    | 5  | 0 | 0 | 0 | 0 | 0 |
| 11 | 20 | 6 | 9.6 | 10 | 3 | 3 |
|    | 5  | 7 | 9 | 7 | 1 | 2 |
| 12 | 20 | 9 | 9 | 9 | 3 | 4 |
|    | 5  | 5 | 3 | 6 | 1 | 1 |
| 13 | 20 | 1 | 8 | 8 | 2 | 5 |
|    | 5  | 0 | 8 | 8 | 0 | 4 |
| 14 | 20 | 9 | 7 | 9 | 3 | 4 |
|    | 5  | 2 | 6 | 8 | 0 | 0 |
| 15 | 20 | 5 | 5 | 10 | 0 | 3 |
|    | 5  | 0 | 7 | 5 | 0 | 0 |
| 16 | 20 | 3 | 7 | 8 | 3 | 6 |
|    | 5  | 0 | 8 | 7 | 0 | 0 |
| 17 | 20 | 7 | 8 | 7 | 1 | 5 |
|    | 5  | 7 | 5 | 2 | 0 | 0 |
| 18 | 20 | 9 | 9 | 7 | 3 | 5 |
|    | 5  | 5 | 8 | 6 | 0 | 0 |
| 19 | 20 | 5 | 9.5 | 7 | 0 | 0 |
|    | 5  | 3 | 0 | 0 | 0 | 0 |
| 20 | 20 | 4 | 10 | 10 | 0 | 4 |
|    | 5  | 0 | 8 | 4 | 0 | 2 |
| 21 | 20 | 7 | 3 | 5 | 3 | 3 |
|    | 5  | 5 | 7 | 1 | 2 | 2 |
| 22 | 20 | 5 | 3 | 8 | 0 | 0 |
|    | 5  | 0 | 6 | 3 | 0 | 0 |
| 23 | 20 | 0 | 5 | 10 | 0 | 2 |
|    | 5  | 9 | 9 | 6 | 0 | 4 |
| 25 | 20 | 9 | 10 | 9 | 4 | 4 |
|    | 5  | 1 | 8 | 3 | 0 | 0 |
| 26 | 20 | 0 | 7 | 10 | 4 | 6 |
|    | 5  | 0 | 3 | 6 | 3 | 3 |
| 27 | 20 | 0 | 10 | 10 | 2 | 4 |
|    |    | 2 |    | 7 | 0 | 0 |

Compound 24 was tested as a post emergent herbicide using the procedure set forth in regard to Table IV. The results are set forth in Table IVa.

For the herbicide post-emergence primary test the procedure employed was to prepare the plots 10 to 14 days in advance of spraying. The standard size flats described TABLE IVa.—O-butyl phenylphosphono isothiocyanatothionate

| Lbs./acre | Cotton | Beans | Cucumber | Wheat | Oats | Flax | Peas | Sugar Beets | Radish | Alfalfa |
|---|---|---|---|---|---|---|---|---|---|---|
| 20 | 9 | 8 | 10 | 5 | 8 | 10 | 8 | 10 | 10 | 10 |
| 10 | 9 | 8 | 10 | 5 | 9 | 9 | 7 | 10 | 10 | 9 |
| 5 | 6 | 8 | 9 | 2 | 7 | 9 | 0 | 9 | 9 | 8 |
| 2 | 4 | 7 | 8 | 0 | 0 | 9 | 0 | 9 | 4 | 5 |
| 1 | 3 | 5 | 9 | 0 | 0 | 7 | 0 | 8 | 4 | 3 |

Similar results to those obtained in Table IV with Compounds 1–27 inclusive are obtained by replacing formulation A by B, formulation B consisting of 50 parts by weight of the herbicide
45 parts by weight of xylene
5 parts by weight of p-octylphenol-ethylene oxide adduct having 10 ethylene oxide units.

4 grams of formula B is then emulsified with 50 ml. of water before applying the herbicide to the plants.

Compound 7 (O-butyl phenylphosphonochloridothionate) was employed in further herbicide tests.

In the herbicide-pre-emergence primary test the flats to be treated were prepared one day prior to treatment and watered down. A standard size flat (14″ x 10″ x 3½″) were planted ½ to cotton and ½ to corn. This flat was then over-seeded one-half to a grass (Setaria viridis or rye grass or wild oats) and one-half to a broadleaf (buckhorn plantain or pigweed). There was then applied to the soil an emulsion consisting of 4 grams of formulation A in 50 ml. of water at the indicated rates of application of active ingredient (herbicide). Observations and records were made one to two weeks after treatment. The same 0 to 10 scale was employed as previously set forth.

above were planted ½ to cotton and ½ to corn. The flat was then overseeded ½ to a grass (Sertaria viridis or wild oats or rye grass) and ½ to a broadleaf (buckhorn plantain or pigweed). The plants in the flats were 10 to 14 days old at time of application of the herbicide. The herbicide was then applied to the flats as an emulsion consisting of 4 grams of formulation A in 50 ml. of water at the indicated rates of application of active ingredient. The same 0 to 10 scale was employed as set forth previously when the observations were recorded 5 days after application of the herbicide.

The herbicide post-emergence secondary test was carried out in the same manner as in the primary test with the following change in the flats. Two flats were used per treatment. One was planted with ½ corn and ½ cotton and the other with ½ beans and ½ oats. One flat was ½ overseeded with rye grass and Setaria or wild oats and one flat was overseeded with buckhorn plantain and pigweed.

TABLE V.—COMPOUND 7 PRIMARY TEST

| Type of Test | Lbs./acre | Corn | Cotton | Wheat | Oats | Grass | Broadleaf |
|---|---|---|---|---|---|---|---|
| Pre-Emergence | 20 | 0 | 0 | | | 0 | 0 |
|  | 5 | 0 | 1 | | | 0 | 2 |
| Post-Emergence | 20 | 3 | 8 | 9.6 | 8.3 | 4 | 10 |
|  | 5 | 1 | 5 | 4.0 | 6.3 | 3 | 9 |

Similar results to those obtained in Table V are obtained by replacing formulation A emulsified in water by 4 grams of formulation B emulsified in 50 ml. of water.

TABLE VI.—COMPOUND 7 POST-EMERGENCE

| Lbs./acre | Bean | Cotton | Rye Grass | Wheat | Radish | Tomato | Lambs Quarter | Sugar Beets | Flax | Alfalfa | Oats |
|---|---|---|---|---|---|---|---|---|---|---|---|
| 20 | 8 | 8 | 7 | 0 | 10 | 8 | 7 | 10 | 10 | 10 | 7 |
| 10 | 7 | 5 | 0 | 0 | 4 | 7 | 5 | 9 | 10 | 10 | 0 |
| 5 | 7 | 4 | 0 | 0 | 5 | 6 | 0 | 9 | 10 | 10 | 0 |
| 2.5 | 3 | 0 | 0 | 0 | 2 | 8 | 10 | 1 | 5 | 6 | 0 |
| 1.2 | 4 | 3 | 0 | 0 | 2 | 7 | 4 | 0 | 0 | 3 | 0 |

The herbicide-pre-emergence secondary test was carried out in the same manner as in the primary test with the following change in the flats. Two flats were used per treatment. One was planted with ½ corn and ½ cotton and the other with ½ beans and ½ oats. One flat was ½ overseeded with rye grass and Setaria or wild oats and one flat was ½ overseeded with buckhorn plantain or pigweed.

Similar results to those obtained in Table VI were obtained by replacing formulation A emulsified in water by 4 grams of formulation B emulsified in 50 ml. of water. Similar results were also obtained by replacing formulation A by formulation C. Formulation C consisted of 50 parts of the herbicide (active ingredient), 40 parts by weight of Velsicol AR50G, 5 parts by weight of butyl carbitol acetate, and 5 parts by weight of Triton X61.

TABLE VII.—COMPOUND 7 PRE-EMERGENCE

| Lbs./acre | Bean | Wheat | Oats | Tomato | Rice | Sugar Beets | Radish | Alfalfa |
|---|---|---|---|---|---|---|---|---|
| 20 | 2 | 0 | 1 | 3 | 0 | 3 | 2 | 10 |
| 10 | 1 | 0 | 0 | 1 | 0 | 1 | 0 | 1 |
| 5 | 0 | 0 | 1 | 0 | 0 | 0 | 0 | 0 |
| 2.5 | 0 | 0 | 1 | 0 | 0 | 0 | 0 | 0 |
| 1.2 | 2 | 0 | 0 | 0 | 0 | 0 | 0 | 0 |

It will be observed that compound 7 was effective as a post-emergent herbicide, particularly against broadleaf weeds.

As used in the present specification and claims the term aryl is used in its normally accepted sense to denote carbocyclic aryl groups.

Where reference is made in the claims to the herbicide being applied to the soil it will be understood that in post-emergent application a portion of the herbicide will also be applied on the leaves and other portions of the plant above the surface of the ground.

Since the compounds of the present invention show greater herbicidal activity against broad leafed plants than against narrow leafed plants, they can be used to protect narrow leaf plant crops, e.g., wheat or oats, containing broad leafed weeds, e.g., plantain, by applying sufficient herbicide to kill the broad leafed plants but not the narrow leafed plants. Thus, 5 lbs./acre of compound 7 can be used to protect wheat or oats from an infestation of plantain.

What is claimed is:

1. A method of controlling the growth of undesirable plants comprising applying to the situs of such plants a herbicidally effective amount of a compound having the formula

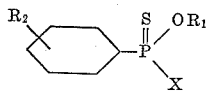

where $R_1$ is selected from the group consisting of lower alkyl, lower haloalkyl, lower alkoxyphenyl, nitrohalophenyl, phenyl, lower alkylphenyl, benzyl, halophenyl, where the halogen has an atomic weight between 35 and 80, and acyloxyethyl; $R_2$ is selected from the group consisting of hydrogen, lower alkyl and halogen and X is selected from the group consisting of halogen of atomic weight between 35 and 80 and —NCS.

2. A method according to claim 1 wherein the compound is applied before the emergence of the plants.

3. A method according to claim 1 wherein the compound is applied after the emergence of the plants.

4. A method of controlling the growth of undesirable plants comprising applying to the soil in the situs of such plants a herbicidally effective amount of an O-alkyl phenylphosphonochloridothionate where the alkyl group has 1 to 10 carbon atoms.

5. A method according to claim 4 wherein the O-alkyl is O-butyl.

6. A method of controlling the growth of undesirable plants comprising applying to the plants after their emergence from the soil a herbicidally effective amount of O-butyl phenylphosphonochloridothionate.

7. A method of controlling the growth of undesirable plants comprising applying to the soil in the situs of such plants a herbicidally effective amount of an O-alkyl chlorophenylphosphonochloridothionate wherein the alkyl group has 1 to 10 carbon atoms.

8. A method of controlling the growth of undesirable plants comprising applying to the soil in the situs of such plants a herbicidally effective amount of an O-lower chloroalkyl phenylphosphonochloridothionate having 1 to 2 chlorine atoms in the chloroalkyl group.

9. A method according to claim 8 wherein the herbicide is applied after emergence of the plants.

10. A method of controlling the growth of undesirable plants comprising applying to the soil in the situs of such plants a herbicidally effective amount of an O-lower alkyl carbocyclic arylphosphonochloridothionate, said lower alkyl group having 1 to 10 carbon atoms, and said carbocyclic aryl group has a single ring and has 6 to 10 carbon atoms.

11. A method of controlling the growth of undesirable plants comprising applying to the soil in the situs of such plants a herbicidally effective amount of an O-lower alkyl carbocyclic arylphosphonoisocyanatothionate wherein the lower alkyl group has 1 to 10 carbon atoms and the carbocyclic aryl has a single ring and has 6 to 10 carbon atoms.

12. A method according to claim 1 wherein the plants are broad leafed plants.

13. A method of controlling the growth of broad leafed plants in a crop of narrow leafed plants comprising applying to the plants after their emergence from the soil an amount of the compound of claim 1 which is herbicidal to the broad leafed plants but which is non-herbicidal to the narrow leafed plants.

14. A method according to claim 1 wherein X is —NCS.

15. A method of controlling the growth of undesirable plants comprising applying to the soil and situs of such plants a herbicidally effective amount of an O-alkyl phenylphosphonoisothiocyanatothionate wherein the alkyl group has 1 to 10 carbon atoms.

16. A method according to claim 15 wherein the O-alkyl is O-butyl.

17. A method of controlling the growth of undesirable plants comprising applying to the plants a herbicidally effective amount of an O-alkyl phenylphosphonoisothiocyanatothionate.

18. A method of controlling the growth of undesirable plants comprising applying to the soil and situs of such plants a herbicidally effective amount of an O-alkyl chlorophenylphosphonoisothiocyanatothionate wherein the alkyl group has 1 to 10 carbon atoms.

References Cited

UNITED STATES PATENTS

| | | | |
|---|---|---|---|
| 2,836,534 | 5/1948 | Birum | 71—2.3 X |
| 2,874,178 | 2/1959 | Britton et al. | 176—30 X |
| 3,033,667 | 5/1962 | Markley | 71—2.3 |

FOREIGN PATENTS 1,142,606  1/1963  Germany.

LEWIS GOTTS, *Primary Examiner.*

JAMES O. THOMAS, Jr., *Assistant Examiner.*